(12) United States Patent
Kang et al.

(10) Patent No.: US 12,485,792 B2
(45) Date of Patent: Dec. 2, 2025

(54) SYSTEM AND METHOD FOR ACTIVE ENERGY MANAGEMENT FOR AN ELECTRIC VEHICLE

(71) Applicant: GM GLOBAL TECHNOLOGY OPERATIONS LLC, Detroit, MI (US)

(72) Inventors: Jun-mo Kang, Ann Arbor, MI (US); Chen-Fang Chang, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 18/465,454

(22) Filed: Sep. 12, 2023

(65) Prior Publication Data

US 2025/0083562 A1 Mar. 13, 2025

(51) Int. Cl.
*B60L 58/13* (2019.01)

(52) U.S. Cl.
CPC ........... *B60L 58/13* (2019.02); *B60L 2200/10* (2013.01); *B60L 2200/36* (2013.01); *B60L 2250/10* (2013.01)

(58) Field of Classification Search
CPC .. B60L 58/13; B60L 2200/10; B60L 2200/36; B60L 2250/10
See application file for complete search history.

(56) References Cited

U.S. PATENT DOCUMENTS

| | | | | |
|---|---|---|---|---|
| 5,307,463 | A | * 4/1994 | Hyatt | G06F 13/387 710/1 |
| 6,216,956 | B1 | * 4/2001 | Ehlers | F24F 11/62 236/47 |
| 8,428,782 | B2 | * 4/2013 | Imes | G05D 23/1923 700/286 |
| 2017/0141368 | A1 | * 5/2017 | Ricci | B60L 53/52 |
| 2021/0313804 | A1 | 10/2021 | Wiegman | |

FOREIGN PATENT DOCUMENTS

DE  102021130065 A1  7/2022

* cited by examiner

*Primary Examiner* — Gertrude Arthur Jeanglaude
(74) *Attorney, Agent, or Firm* — Quinn IP Law

(57) ABSTRACT

A method of active energy management for a vehicle including a rechargeable energy storage system (RESS). The method includes: calculating, via a controller programmed with a usable energy algorithm, a usable energy of the at least one power module based on an anode lithium surface density; comparing, via the controller, the usable energy calculated with a first threshold; providing, via the controller, a first notification to a user when the usable energy calculated reaches a first threshold; providing, via the controller, a second notification to the user when the usable energy calculated reaches a second threshold, providing a third notification to the user when the usable energy calculated reaches a third threshold, and suggesting actions to the user based on the notifications.

20 Claims, 5 Drawing Sheets

SYSTEM AND METHOD FOR ACTIVE ENERGY MANAGEMENT FOR AN ELECTRIC VEHICLE

INTRODUCTION

The concepts described herein relate generally to vehicles including rechargeable energy storage systems (RESS). More particularly, the concepts disclosed herein relate to a system and method of active energy management for a vehicle including a RESS, for example, but not limited to, an electric vertical take-off and landing (eVTOL), a motor vehicle having an electrified powertrain or propulsion system, e.g., an electric vehicle (EV) or plug-in hybrid vehicle (PHEV), or another mobile platform, which is operable to calculate a useable energy of RESS based on a anode lithium surface density.

Each RESS can be a single-chemistry or a mixed-chemistry energy system including a battery pack having a plurality of power modules. The number of power modules required is application specific.

Each power module includes a plurality of battery cells, for example but not limited to, lithium-ion battery cells. The chemistry of each battery cell involves a trade-off between a usable capacity, usable energy, and cycle life.

Each battery cell has a thermo-dynamical capacity that is defined when the battery cell is manufactured. However, the usable capacity of the battery cell is how much of the thermo-dynamical capacity is available for a user to access and is typically lower than the thermo-dynamical capacity of the battery cell during transient operating conditions.

The thermo-dynamical energy of a battery cell is the range at which the battery cell can be operated over a state of charge (SOC) range, e.g., 100% SOC means the battery cell is 100% charged to the thermo-dynamical capacity. The usable energy varies over the cycle life of the battery cell and can be significantly reduced, for example but not limited to, during periods of high discharge, and/or when the battery cell is subjected to low ambient temperatures. As such, the usable energy varies proportionally with the thermo-dynamical energy of the battery cells contained therein.

Each vehicle including a RESS has an energy profile that details the amount of energy needed by the vehicle during operation. The energy profile of each vehicle defines the usable capacity required to provide sufficient usable energy to satisfy the needs defined by the vehicle energy profile.

However, vehicles, including but not limited to eVTOL vehicles, may be subjected to low ambient temperatures, which may reduce the usable capacity contained within a battery pack providing power to the eVTOL vehicle.

Additionally, applications, like eVTOL, may experience constant and large load demands during use, requiring high discharge rates for an extended period of time. As such, the usable energy available to power these applications has little opportunity for recovery and may be reduced.

SUMMARY

In view of the above discussion, it is useful to develop a system and method of active energy management for a vehicle including a RESS, for example, but not limited to, an electric vertical take-off and landing (eVTOL), which is configured to actively manage the energy available to provide power to the vehicle by determining a useable energy available to power the vehicle based on an anode lithium surface density. It is also useful that the system and method disclosed provide notifications to a user of the useable energy available to power the vehicle and suggest user actions based on the notifications provided.

Accordingly, a system and method of active energy management system for a vehicle including a rechargeable energy storage system (RESS) is disclosed.

An active energy management system may include a RESS configured for installation into the vehicle, a propulsion system configured for installation into the vehicle, and a controller in communication with the propulsion system and the RESS.

The RESS may include at least one power module and the controller may be programmed with a usable energy algorithm that when executed may be configured to calculate a usable energy of the at least one power module based an anode lithium surface density, compare the usable energy calculated with a first threshold, and provide a first notification to a user when the usable energy calculated reaches the first threshold.

According to one example of the present disclosure, the active energy management system may be installed in an electric vertical take-off and landing (eVTOL) vehicle.

When the active energy management system is installed in the eVTOL vehicle, the first notification may include notifying the user, which may be a pilot, to prepare to initiate landing procedures.

The controller of the active energy management system may be further configured to provide a second notification to the user when the usable energy calculated reaches a second threshold. The second notification may include notifying the user to initiate landing procedures.

The controller may be further configured to provide a third notification to the user when the usable energy calculated reaches a third threshold.

The controller may be further configured to initiate automated landing procedures when the usable energy calculated reaches the third threshold if the landing procedures were not initiated by the user prior to the third notification being provided.

The controller may be further configured to regulate energy consumption by selectively turning off predefined systems when the usable energy calculated reaches the first threshold.

According to another example of the present disclosure, the active energy management system may be installed in an electric truck (eTruck).

When the active energy management system is installed in an eTruck, the user may be a driver, and the first notification may include notifying the driver of a potential increased driving range based on the usable energy calculated.

The controller may be further configured to predict the potential increased driving range based on the usable energy calculated and may suggest the driver reduce a speed of the eTruck to a lower speed to achieve the predicted potential increased driving range.

The controller may be further configured to provide a second notification to the driver when the usable energy calculated reaches a second threshold. The second notification may include notifying the driver of an impending power loss based on the usable energy calculated and may suggest the driver find a suitable place to stop the eTruck for usable energy recovery.

The controller may be configured to notify the driver of a potential range extension based on the usable energy recovered.

A method of active energy management for a vehicle including a rechargeable energy storage system (RESS) may include calculating, via a controller programmed with a usable energy algorithm, a usable energy of the at least one power module based on an anode lithium surface density, comparing, via the controller, the usable energy calculated with a first threshold, and providing, via the controller, a first notification to a user when the usable energy calculated reaches a first threshold.

According to one example of the present disclosure, the method of active energy management may be used in an electric vertical take-off and landing (eVTOL) vehicle application.

When the method of active energy management is used in an eVTOL vehicle application, the first notification provided may include notifying the user to prepare to initiate landing procedures.

The method of active energy management may further include providing, via the controller, a second notification to the user when the usable energy calculated reaches a second threshold. The second notification may include notifying the user to initiate landing procedures.

The method of active energy management may further include providing, via the controller, a third notification to the user when the usable energy calculated reaches a third threshold and initiating, via the controller, automated landing procedures when the usable energy calculated reaches the third threshold if the landing procedures were not initiated by the user prior to the third notification being provided.

The method of active energy management may further include regulating energy consumption, via the controller, by selectively turning off predefined systems when the usable energy calculated reaches the first threshold.

According to one example of the present disclosure, the method of active energy management may be used in an electric truck (eTruck) application.

When the method of active energy management is used in an electric truck (eTruck) application, the user may be a driver and the first notification may include notifying, via the controller, the driver of a potential increased driving range based on the usable energy calculated.

The method of active energy management may further include predicting, via the controller, the increased driving range based on the usable energy calculated.

The method of active energy management may further include suggesting, via the controller, the driver reduce a speed of the eTruck to a lower speed to achieve the predicted increased driving range.

The method of active energy management may further include providing, via the controller, a second notification to the driver when the usable energy calculated reaches a second threshold, wherein the second notification includes notifying the driver of an impending power loss based on the usable energy calculated. The method may include suggesting, via the controller, that the driver find a suitable place to stop the eTruck for usable energy recovery.

The method of active energy management may further include notifying, via the controller, the driver of a potential range extension based on the usable energy recovered.

A vehicle having an active energy management system is also disclosed.

The vehicle including an active energy management system may include a RESS, having at least one power module, a propulsion system, and a controller, in communication with the propulsion system and the RESS.

The RESS and/or the propulsion system may be configured for installation into the vehicle. The controller may be programmed with a usable energy algorithm that when executed may be configured to calculate a usable energy of the at least one power module based an anode lithium surface density, compare the usable energy calculated with a first threshold, provide a first notification to a user when the usable energy calculated reaches the first threshold, provide a second notification to the driver when the usable energy calculated reaches a second threshold, and provide a third notification to the driver when the usable energy calculated reaches a third threshold.

Therefore, by actively managing the energy available to provide power to a vehicle using a useable energy calculated using a usable energy algorithm based on an anode lithium surface density, notifications may be provided to a user when the usable energy calculated reaches threshold values, and suggested actions may be provided to the user based on the notifications provided.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

Figure 1:
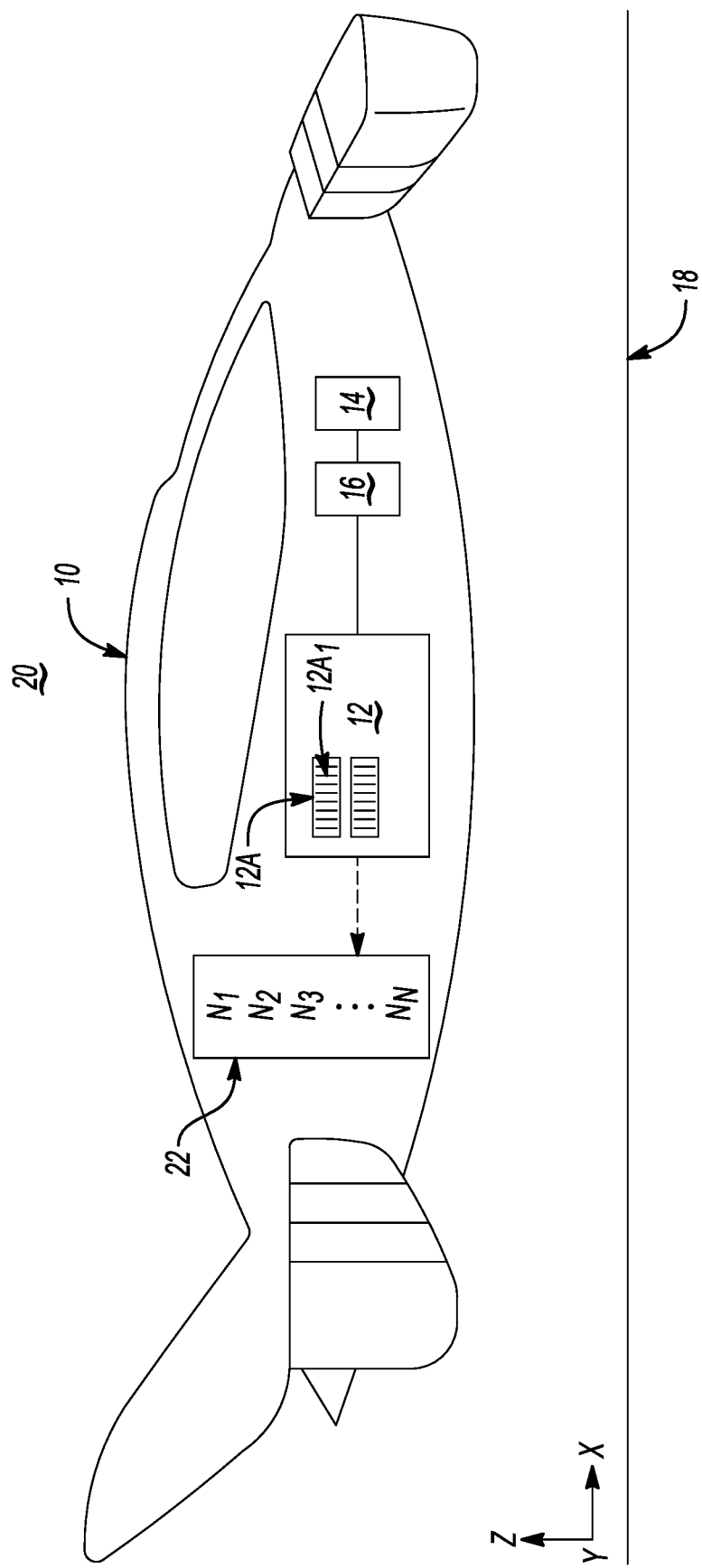
FIG. 1 is a schematic illustration of an electric vertical take-off and landing (eVTOL) vehicle having an active energy management system according to the present disclosure.

The appended drawings are not necessarily to scale, and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

Referring now to the drawings, wherein like numerals indicate like parts in several views, a system and method of active energy management for a vehicle including a rechargeable energy storage system (RESS), and a vehicle including the same are shown and described herein.

As schematically illustrated in FIG. 1, a vehicle 10 includes an electric vertical take-off and landing (eVTOL) vehicle, which includes a rechargeable energy storage system (RESS) 12, a propulsion system 14, and a controller module 16 in communication with the RESS 12 and the propulsion system 14 installed in the vehicle 10.

The RESS 12 is configured to generate and store electrical energy through heat-producing electro-chemical reactions for supplying the electrical energy to the propulsion system 14, which is configured to provide electric vertical thrust to the vehicle 10 to take-off vertically and transition from vertical thrust to horizontal thrust to propel the vehicle horizontally.

The controller module 16 is programmable and may include a central processing unit (CPU) that regulates various functions of the vehicle 10 including the propulsion system 14 and/or the RESS 12. While the vehicle 10 is schematically illustrated as an eVTOL vehicle, the vehicle 10 may also include a terrestrial electric vehicle, as illustrated in FIG. 2.

Figure 2:
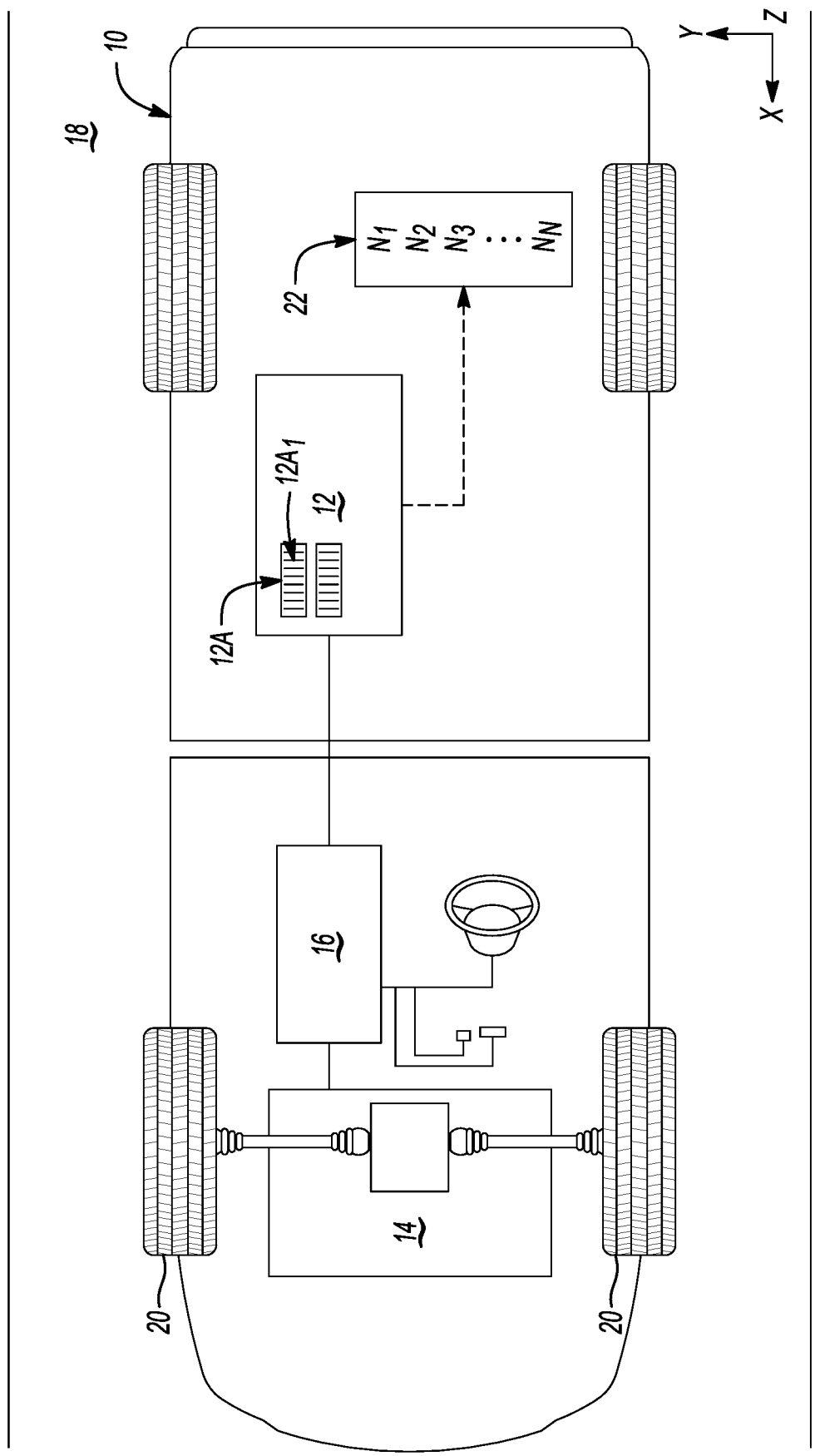
FIG. 2 is a schematic illustration of an electric truck (eTruck) having an active energy management system according to the present disclosure.
Figure 3:
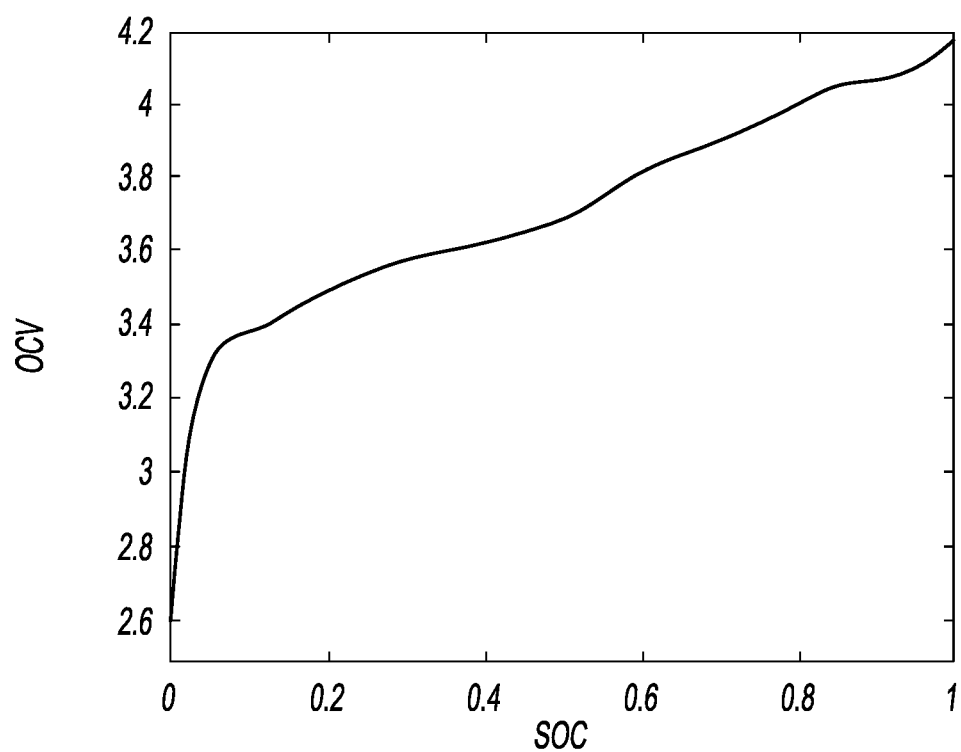
FIG. 3 is an example graphic illustration of state of charge versus open circuit voltage (SOC vs. OCV).

As schematically illustrated in FIG. 2, a vehicle 10 includes a terrestrial electric vehicle (EV), which includes a rechargeable energy storage system (RESS) 12, a propulsion system 14, and a controller module 16 in communication with the RESS 12 and the propulsion system 14 installed in the vehicle 10. The vehicle 10 is schematically illustrated as an electric truck (eTruck), however, the vehicle 10 may also include, but is not limited to, e.g., an electric commercial vehicle, an electric industrial vehicle, an electric watercraft, an electric train or the like.

The RESS 12 is configured to generate and store electrical energy through heat-producing electro-chemical reactions for supplying the electrical energy to the propulsion system 14 to provide power to the vehicle 10 during use, e.g., to provide torque to wheels 18 to move the vehicle 10 along a road 20.

The controller module 16 is programmable and may include a central processing unit (CPU) that regulates various functions of the vehicle 10 including the propulsion system 14 and/or the RESS 12.

In either of the above configurations illustrated in FIG. 1 and/or FIG. 2, the controller module 16 includes a processor and tangible, non-transitory memory, which includes instructions for operation of vehicle 10 including the propulsion system 14 and the RESS 12 programmed therein. The memory may be an appropriate recordable medium that participates in providing computer-readable data or process instructions. Such a recordable medium may take many forms, including, but not limited to, non-volatile media and volatile media.

Non-volatile media for the controller module 16 may include, for example, optical or magnetic disks and other persistent memory. Volatile media may include, for example, dynamic random access memory (DRAM), which may constitute a main memory. Such instructions may be transmitted by one or more transmission medium(s), including coaxial cables, copper wire and fiber optics, including the wires that comprise a system bus coupled to a processor of a computer, or via a wireless connection.

Memory of the controller module 16 may also include a flexible disk, hard disk, magnetic tape, another magnetic medium, a CD-ROM, DVD, another optical medium, etc. The controller module 16 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller module 16 or accessible thereby, including, but not limited to predictive algorithms, may be stored in the memory and automatically executed to provide the required functionality of the vehicle 10 including the propulsion system 14 and the RESS 12.

The controller module 16 is disposed in the vehicle 10 and is in communication with RESS 12 and the propulsion system 14 installed in the vehicle 10.

The RESS 12 includes at least one power module 12A having a plurality of battery cells $12A_1$ contained therein. The controller module 16 is programmed with a usable energy algorithm $EQ_1$ that calculates a usable energy UE in kilowatt hours (kWhr) of the at least one power module 12A based on an anode lithium surface density $C_S$, where the useable energy UE is calculated by the formula below:

$$UE = \text{interpolation }(SOC, OCV, Cs) * (Cs) * \text{Cap}/1000 \qquad [\text{EQ 1}]$$

That is, the usable energy UE is equal to an interpolated voltage corresponding to Cs using (SOC, OCV) multiplied by ($C_S$) multiplied by Cap/1000.

An example of SOC vs. OCV is illustrated in FIG. 2. The SOC is a state of charge (SOC) from zero to one. The OCV is an open circuit voltage (OCV) given the SOC.

$C_S$ is an anode lithium surface density (normalized from zero to one), and Cap is capacity of the battery in Ampere-hour (Ah).

As the power module 12A includes the plurality of batteries $12A_1$, the usable energy UE of the power module 12A varies proportionally with the usable energy UE of the plurality of battery cells $12A_1$ contained therein.

Each of the plurality of battery cells 12A has a thermo-dynamical energy capacity TC that is defined when each of the plurality of battery cells 12A is manufactured. The usable energy capacity UC of each of the plurality of battery cells 12A is how much of the thermo-dynamical energy capacity TC is available for a user to access. The usable energy capacity UC depends on the operating conditions, and typically less than or equal to the thermo-dynamical energy capacity TC of the battery cell.

The usable energy UE is the amount of energy available from each of the plurality of battery cells $12A_1$ based on the usable energy capacity UC of each of the plurality of battery cells $12A_1$, and can vary based on operating conditions including temperature, i.e., the usable energy UE of each of the plurality of battery cells $12A_1$ can be significantly reduced, for example but not limited to, during periods of high discharge, and/or when the battery cell is subjected to low ambient temperatures.

For example, under steady state conditions, i.e., zero current discharge, when the SOC equals 80%, the SOC is indicative of the usable energy UE.

However, during transient conditions, i.e., periods of high current (high C-Rates), when the SOC equals 80%, the usable energy UE is reduced due to slow diffusion, which decreases the anode lithium surface density $C_S$ and decreases the terminal voltage $V_T$. Decreasing voltage results in decreasing power, which coincides with decreasing usable energy UE.

As the current is reduced and approaches zero, the terminal voltage $V_T$ gradually recovers and the anode lithium surface density $C_S$ increases. Recovering voltage results in increasing usable energy UE. As such, the anode lithium surface density $C_S$ is indicative of the usable energy UE available.

The controller module 16 calculates the usable energy UE of the at least one power module based on the anode lithium surface density $C_S$, compares the usable energy UE calculated with a first threshold $TH_1$ and provides a first notification $N_1$ to a user when the usable energy UE calculated reaches the first threshold $TH_1$. The first notification $N_1$ is displayed on a user display 22 installed within the vehicle 10.

It should be appreciated, however, that the first notification $N_1$ may be provided to individuals other than the user, and the first notification $N_1$ could be provided to an external display (not shown) not installed in and/or remote to the vehicle 10.

According to one aspect of the present disclosure, when the vehicle 10 is an eVTOL vehicle, the first notification $N_1$ includes notifying the user to prepare to initiate landing procedures.

The controller module 16 is further configured to provide a second notification $N_2$ to the user when the usable energy UE calculated reaches a second threshold $TH_2$.

The second notification $N_2$ includes notifying the user to initiate landing procedures.

The controller module 16 is further configured to provide a third notification $N_3$ to the user when the usable energy UE calculated reaches a third threshold $TH_3$ and to initiate automated landing procedures when the calculated energy UE reaches the third threshold $TH_3$ if the landing procedures were not initiated by the user prior to the third notification $N_3$ being provided.

The third notification $N_3$ includes notifying the user that landing procedures are being initiated automatically and the controller module is configured to initiate automated landing procedures when the calculated energy UE reaches the third threshold $TH_3$ if the landing procedures were not initiated by the user prior to the third notification $N_3$ being provided.

The controller module 16 may be further configured to regulate energy consumption by selectively turning off predefined systems when the usable energy UE calculated reaches the first threshold $TH_1$, the second threshold $TH_2$, and/or the third threshold $TH_3$.

According to another aspect of the present disclosure, when the vehicle 10 is a terrestrial electric vehicle, for example but not limited to, an electric truck (eTruck), the user is a driver, and the first notification $N_1$ includes notifying the driver of a potential increased driving range based on the usable energy UE calculated.

The controller module 16 is further configured to predict the potential increased driving range based on the usable energy UE calculated, and suggest the driver reduce a speed of the eTruck to a lower speed to achieve the predicted potential increased driving range.

The controller module 16 is further configured to provide a second notification $N_2$ to the driver when the usable energy UE calculated reaches a second threshold $TH_2$.

The second notification includes notifying the driver of an impending power loss based on the usable energy UE calculated.

The controller module 16 is further configured to suggest the drier find a suitable place to stop the eTruck for usable energy UE recovery, and notify the driver of a potential range extension based on the usable energy UE recovered.

Figure 4A:
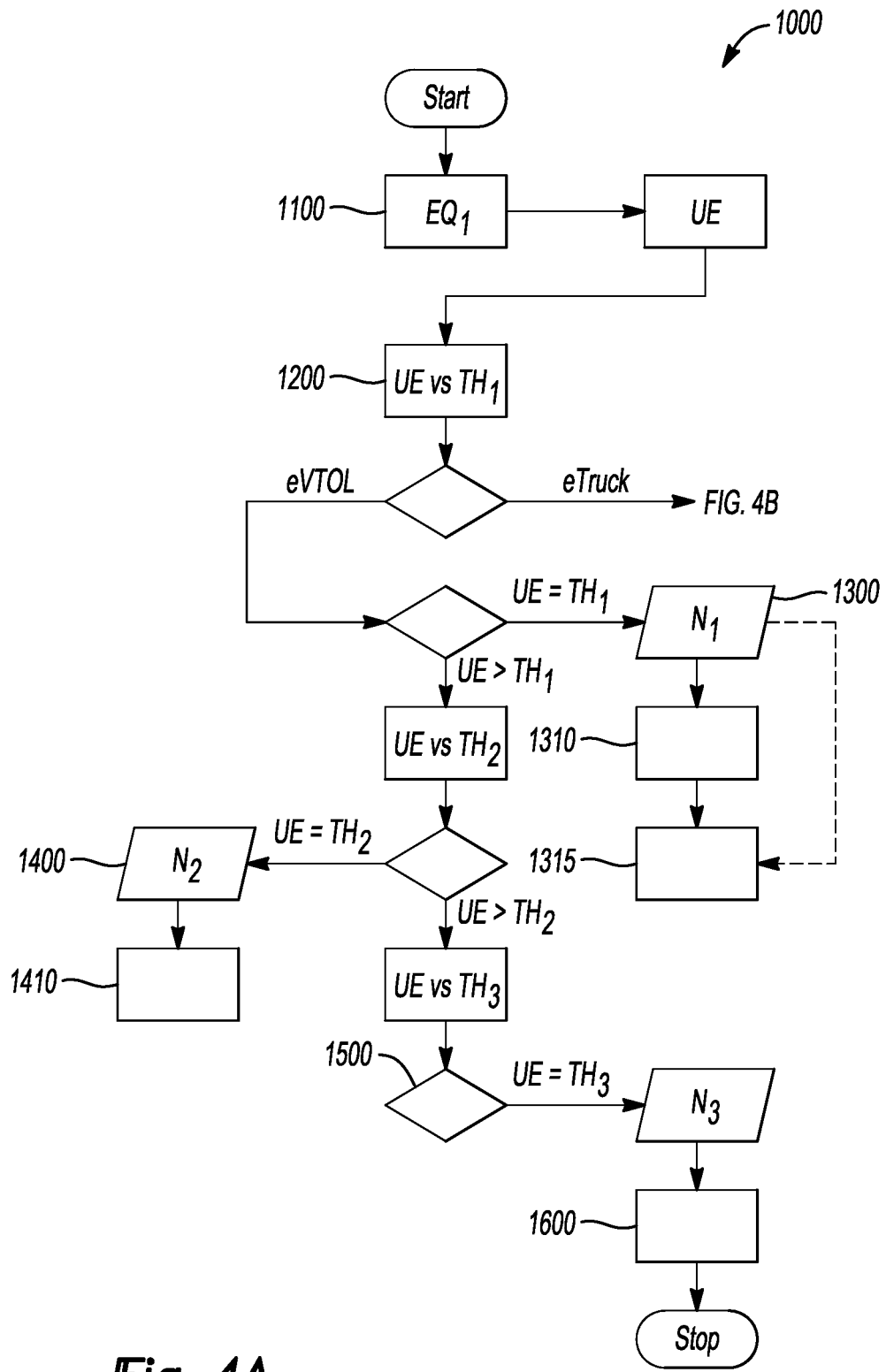
FIG. 4A is a flow chart illustrating a method of active energy management including notifications for an eVTOL vehicle according to the present disclosure.

As illustrated in FIG. 4A with continued reference to FIG. 1, a method 1000 of active energy management for a vehicle 10 including a RESS 12 is also disclosed.

The method 1000 of active energy management includes calculating 1100, via a controller module 16 programmed with a usable energy algorithm $EQ_1$, a usable energy UE of the at least one power module 12A based on an anode lithium surface density $C_S$, comparing 1200, via the controller module 16, the usable energy UE calculated with a first threshold, and providing 1300, via the controller module 16, a first notification $N_1$ to a user when the usable energy UE calculated reaches a first threshold $TH_1$.

Providing 1300 the first notification $N_1$ may include displaying the first notification $N_1$ on a user display 22 installed within the vehicle 10.

It should be appreciated, however, that the first notification $N_1$ may be provided to individuals other than the user and the first notification $N_1$ could be provided to the other individuals on an external display (not shown) not installed in and/or remote to the vehicle 10.

According to one aspect of the present disclosure, when the vehicle 10 is an eVTOL vehicle, providing the first notification $N_1$ includes notifying 1310 the user to prepare to initiate landing procedures.

The method 1000 further includes providing 1400, via the controller module 16, a second notification $N_2$ to the user when the usable energy calculated reaches a second threshold $TH_2$.

Providing 1400 the second notification $N_2$ includes notifying 1410 the user to initiate landing procedures.

The method 1000 further includes providing 1500, via the controller module 16, a third notification $N_3$ to the user when the usable energy UE calculated reaches a third threshold $TH_3$.

The method 1000 further includes initiating 1600, via the controller module 16, automated landing procedures when the usable energy UE calculated reaches the third threshold $TH_3$ if the landing procedures were not initiated by the user prior to the third notification $N_3$ being provided.

The method 1000 may further include regulating 1315 energy consumption, via the controller module 16, by selectively turning off predefined systems when the usable energy UE calculated reaches the first threshold $TH_1$.

Figure 4B:
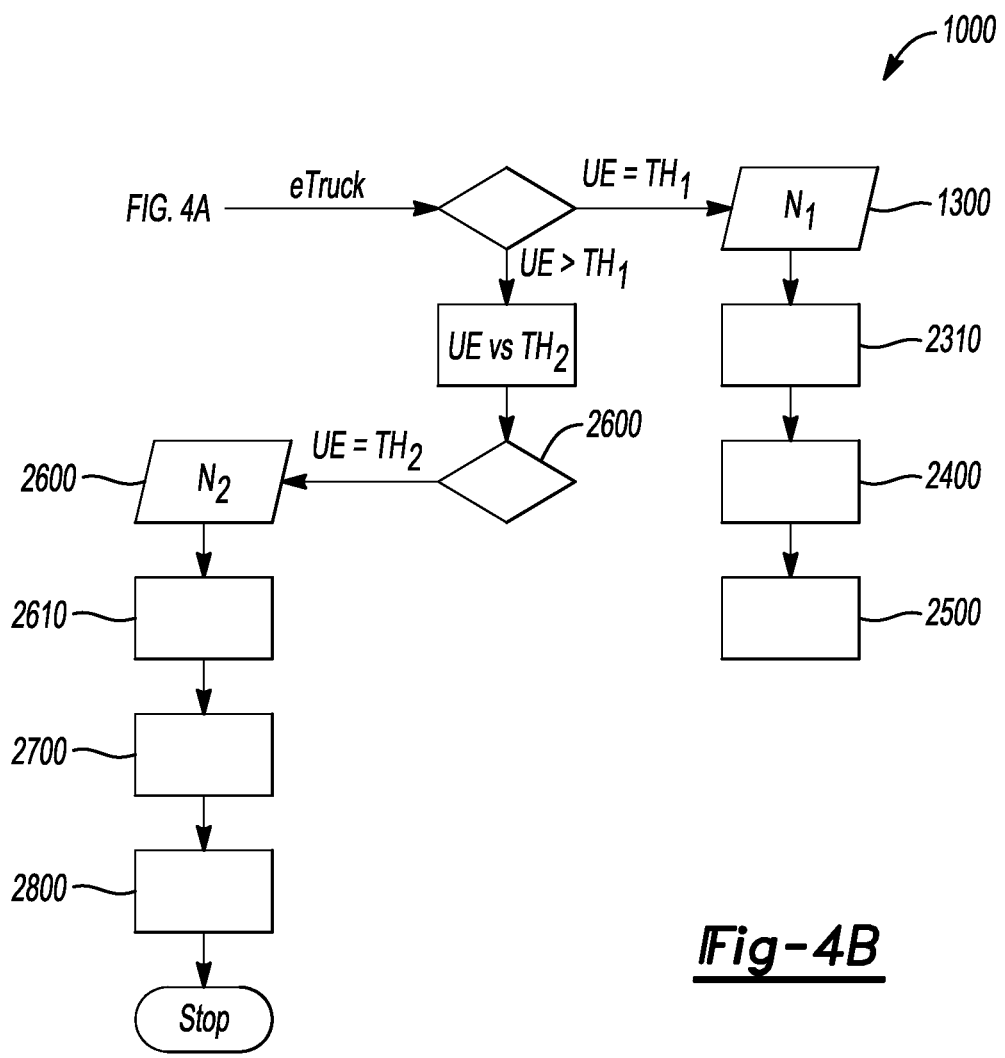
FIG. 4B is a flow chart illustrating a method of active energy management including notifications for an eTruck according to the present disclosure.

According to one aspect of the present disclosure, when the vehicle 10 is an electric truck (eTruck), as illustrated in FIG. 4B with continued reference to FIG. 4A, the user is a driver, providing 1300 a first notification $N_1$ includes notifying 2310 the driver, via the controller module 16, of a potential increased driving range based on the usable energy UE calculated.

The method 1000 further includes 2400 predicting, via the controller module, the increased driving range based on the usable energy UE calculated, and suggesting 2500, via the controller module 16, the driver reduce a speed of the eTruck to a lower speed to achieve the predicted increased driving range.

The method 1000 further includes providing 2600, via the controller module 16, a second notification $N_2$ to the driver when the usable energy UE calculated reaches a second threshold $TH_2$.

Providing 2600 the second notification includes notifying 2610 the driver of an impending power loss based on the usable energy UE calculated, suggesting 2700, via the controller module 16, that the driver find a suitable place to stop the eTruck for usable energy UE recovery, and notifying 2800, via the controller module 16, the driver of a potential range extension based on the usable energy UE recovered.

As further illustrated in FIG. 1 and/or FIG. 2, a vehicle 10 having an active energy management system includes a RESS 12 having at least one power module 12A installed in the vehicle 10, a propulsion system 14 installed in the vehicle 10, a controller module 16 in communication with the RESS 12 and the propulsion system 14, the controller module 16 programmed with a usable energy algorithm $EQ_1$ that when executed is configured to calculate a usable energy UE of the at least one power module 12A based an anode lithium surface density $C_S$, compare the usable energy UE calculated with a first threshold $TH_1$, provide a first notification $N_1$ to a user when the usable energy UE calculated reaches the first threshold $TH_1$, provide a second notification $N_2$ to the driver when the usable energy UE calculated reaches a second threshold $TH_2$, and provide a third notification $N_3$ to the driver when the usable energy UE calculated reaches a third threshold $TH_3$.

Accordingly, by calculating a usable energy and comparing the useable energy calculated using a usable energy algorithm with various thresholds, notifications can be provided to a user at the various thresholds, which can, for example, include suggested actions that the user can take based on the usable energy calculated and/or inform the user of automatic actions that will be taken by the system to regulate energy use and/or a function of the vehicle.

Further, the usable energy algorithm used to calculate the usable energy is based on an anode lithium surface density and, as such, is not based on tracking a history of charging and discharging the plurality of battery cells included in the power module.

Therefore, by actively managing the energy available to provide power to a vehicle using a useable energy calculated using a usable energy algorithm based on an anode lithium surface density, notifications may be provided to a user when the usable energy calculated reaches threshold values, and suggested actions may be provided to the user based on the notifications provided.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other examples for carrying out the present teachings have been described in detail, various alternative designs and embodiments exist for practicing the present teachings defined in the appended claims.

What is claimed is:

1. An active energy management system for a vehicle including a rechargeable energy storage system (RESS), the active energy management system comprising:
    a RESS including at least one power module, the RESS configured for installation into a vehicle;
    a propulsion system configured for installation into the vehicle; and
    a controller module in communication with the RESS and the propulsion system, the controller module programmed with a usable energy algorithm that when executed is configured to:
        calculate a usable energy of the at least one power module based on an anode lithium surface density;
        compare the usable energy calculated with a first threshold; and
        provide a first notification to a user when the usable energy calculated reaches the first threshold.

2. The active energy management system as recited in claim 1, wherein the vehicle is an electric vertical take-off and landing (eVTOL) vehicle and the first notification includes notifying the user to prepare to initiate landing procedures.

3. The active energy management system as recited in claim 2, wherein the controller module is further configured to provide a second notification to the user when the usable energy calculated reaches a second threshold.

4. The active energy management system as recited in claim 3, wherein the second notification includes notifying the user to initiate landing procedures.

5. The active energy management system as recited in claim 4, wherein the controller module is further configured to provide a third notification to the user when the usable energy calculated reaches a third threshold.

6. The active energy management system as recited in claim 5, wherein the controller module is further configured to initiate automated landing procedures when the usable energy calculated reaches the third threshold if the landing procedures were not initiated by the user prior to the third notification being provided.

7. The active energy management system as recited in claim 1, wherein the controller module is further configured to regulate energy consumption by selectively turning off predefined systems when the usable energy calculated reaches the first threshold.

8. The active energy management system as recited in claim 1, wherein the vehicle is an electric truck (eTruck), the user is a driver, and the first notification includes notifying the driver of a potential increased driving range based on the usable energy calculated.

9. The active energy management system as recited in claim 8, wherein the controller module is further configured to:
    predict the potential increased driving range based on the usable energy calculated;
    suggest the driver reduce a speed of the eTruck to a lower speed to achieve the predicted potential increased driving range;
    provide a second notification to the driver when the usable energy calculated reaches a second threshold, wherein the second notification includes notifying the driver of an impending power loss based on the usable energy calculated;
    suggest the driver find a suitable place to stop the eTruck for usable energy recovery; and
    notify the driver of a potential range extension based on the usable energy recovered.

10. A method of active energy management for a vehicle including a rechargeable energy storage system (RESS), the method comprising:
    calculating, via a controller module programmed with a usable energy algorithm, a usable energy of an at least one power module based on an anode lithium surface density, wherein the controller module is in communication with the RESS and a propulsion system, the RESS includes the at least one power module, and the RESS and the propulsion system are configured for installation into the vehicle;

comparing, via the controller module, the usable energy calculated with a first threshold; and providing, via the controller module, a first notification to a user when the usable energy calculated reaches the first threshold.

11. The method of active energy management as recited in claim 10, wherein the vehicle is an electric vertical take-off and landing (eVTOL) vehicle and the first notification includes notifying the user to prepare to initiate landing procedures.

12. The method of active energy management as recited in claim 11, further comprising:

providing, via the controller module, a second notification to the user when the usable energy calculated reaches a second threshold.

13. The method of active energy management as recited in claim 12, wherein the second notification includes notifying the user to initiate landing procedures.

14. The method of active energy management as recited in claim 13, further comprising:

providing, via the controller module, a third notification to the user when the usable energy calculated reaches a third threshold.

15. The method of active energy management as recited in claim 14, further comprising:

initiating, via the controller module, automated landing procedures when the usable energy calculated reaches the third threshold if the landing procedures were not initiated by the user prior to the third notification being provided.

16. The method of active energy management as recited in claim 10, further comprising:

regulating energy consumption, via the controller module, by selectively turning off predefined systems when the usable energy calculated reaches the first threshold.

17. The method of active energy management as recited in claim 10, wherein the vehicle is an electric truck (eTruck), the user is a driver and the first notification includes notifying the driver, via the controller module, of a potential increased driving range based on the usable energy calculated.

18. The method of active energy management as recited in claim 17, further comprising:

predicting, via the controller module, the potential increased driving range based on the usable energy calculated; and suggesting, via the controller module, the driver reduce a speed of the eTruck to a lower speed to achieve the predicted increased driving range.

19. The method of active energy management as recited in claim 18, further comprising:

providing, via the controller module, a second notification to the driver when the usable energy calculated reaches a second threshold, wherein the second notification includes notifying the driver of an impending power loss based on the usable energy calculated;

suggesting, via the controller module, that the driver find a suitable place to stop the eTruck for usable energy recovery; and notifying, via the controller module, the driver of a potential range extension based on the usable energy recovered.

20. A vehicle having an active energy management system comprising:

a RESS having at least one power module installed in the vehicle;

a propulsion system installed in the vehicle; and a controller module in communication with the RESS and the propulsion system, the controller module programmed with a usable energy algorithm that when executed is configured to:

calculate a usable energy of the at least one power module based on an anode lithium surface density;

compare the usable energy calculated with a first threshold;

provide a first notification to a user when the usable energy calculated reaches the first threshold;

provide a second notification to the user when the usable energy calculated reaches a second threshold; and provide a third notification to the user when the usable energy calculated reaches a third threshold.

* * * * *